(12) United States Patent
Wang et al.

(10) Patent No.: US 11,455,472 B2
(45) Date of Patent: Sep. 27, 2022

(54) METHOD, DEVICE AND COMPUTER READABLE STORAGE MEDIUM FOR PRESENTING EMOTION

(71) Applicant: Shanghai Xiaoi Robot Technology Co., Ltd., Shanghai (CN)

(72) Inventors: Hui Wang, Shanghai (CN); Yuning Wang, Shanghai (CN); Pinpin Zhu, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/992,284

(22) Filed: Aug. 13, 2020

(65) Prior Publication Data

US 2020/0372222 A1    Nov. 26, 2020

Related U.S. Application Data

(63) Continuation of application No. 16/052,345, filed on Aug. 1, 2018, now Pat. No. 10,783,329.

(30) Foreign Application Priority Data

Dec. 7, 2017   (CN) .......................... 201711285485.3
Dec. 13, 2017  (CN) .......................... 201711327146.7
(Continued)

(51) Int. Cl.
*G06F 40/30*   (2020.01)
*G06F 40/103*  (2020.01)
(Continued)

(52) U.S. Cl.
CPC ............ *G06F 40/30* (2020.01); *G06F 40/103* (2020.01); *G06F 40/205* (2020.01); *G06F 40/289* (2020.01)

(58) Field of Classification Search
CPC ........ G06F 17/27; G06F 40/30; G06F 40/103; G06F 40/205; G06F 40/289; G10L 13/08; G05B 13/02; G08B 25/10
See application file for complete search history.

(56) References Cited

U.S. PATENT DOCUMENTS 7,065,490 B1 *  6/2006  Asano ................... G10L 13/033
                                                          318/568.12
7,376,897 B1 *  5/2008  Mao ........................ G06F 9/451
                                                             715/708
(Continued)

FOREIGN PATENT DOCUMENTS

CN    101604204 A    12/2009
CN    102033865 A     4/2011
(Continued)

*Primary Examiner* — Anne L Thomas-Homescu
(74) *Attorney, Agent, or Firm* — Flener IP & Business Law; Zareefa B. Flener

(57) ABSTRACT

The present disclosure relates to a method, device and computer readable storage medium for presenting an emotion. The method for presenting the emotion includes obtaining a first emotion presentation instruction, wherein the first emotion presentation instruction includes at least one first emotion presentation modality and at least one emotional style, and the at least one first emotion presentation modality includes a text emotion presentation modality; and presenting an emotion corresponding to one or more of the at least one emotional style according to each of the at least one first emotion presentation modality. The present disclosure can realize text-based multi-modal emotion presentation modes, and thus user experience can be improved.

14 Claims, 4 Drawing Sheets

(30) Foreign Application Priority Data

| Dec. 13, 2017 | (CN) | 201711327784.9 |
| Dec. 13, 2017 | (CN) | 201711328629.9 |
| Dec. 13, 2017 | (CN) | 201711328630.1 |

(51) Int. Cl.
*G06F 40/205* (2020.01)
*G06F 40/289* (2020.01)

(56) References Cited

U.S. PATENT DOCUMENTS

| | | | | |
|---|---|---|---|---|
| 2004/0019484 | A1* | 1/2004 | Kobayashi | G10L 13/02 704/258 |
| 2008/0269958 | A1* | 10/2008 | Filev | A61B 5/18 701/1 |
| 2011/0112826 | A1* | 5/2011 | Wang | G06F 40/30 704/9 |
| 2013/0346067 | A1* | 12/2013 | Bhatt | G06F 40/30 704/9 |
| 2014/0223462 | A1* | 8/2014 | Aimone | H04N 21/4307 725/10 |
| 2014/0253326 | A1* | 9/2014 | Cho | G08B 7/066 340/539.13 |
| 2015/0121251 | A1* | 4/2015 | Kadirvel | H04M 1/72427 715/753 |
| 2015/0347363 | A1* | 12/2015 | Manganaro | G06F 40/117 715/256 |
| 2016/0004672 | A1* | 1/2016 | Sakunkoo | G06F 40/109 715/269 |
| 2016/0063993 | A1* | 3/2016 | Dolan | G06F 16/00 704/254 |
| 2016/0154959 | A1* | 6/2016 | Chin | H04L 51/10 726/22 |
| 2016/0163332 | A1* | 6/2016 | Un | G06F 16/90332 704/260 |
| 2017/0104866 | A1* | 4/2017 | Campbell | G06F 3/04842 |
| 2017/0148434 | A1* | 5/2017 | Monceaux | B25J 11/0015 |
| 2017/0206694 | A1* | 7/2017 | Jiao | G06T 7/246 |
| 2017/0302709 | A1* | 10/2017 | Jones | G06Q 10/109 |
| 2018/0085928 | A1* | 3/2018 | Yamato | B25J 13/003 |
| 2018/0124243 | A1* | 5/2018 | Zimmerman | H04M 3/5175 |
| 2019/0163961 | A1* | 5/2019 | Asukai | G06F 16/5866 |
| 2019/0172243 | A1* | 6/2019 | Mishra | G10L 15/063 |
| 2019/0342243 | A1* | 11/2019 | Lee | H04M 1/725 |
| 2019/0385066 | A1* | 12/2019 | Dong | G06N 5/02 |
| 2020/0016745 | A1* | 1/2020 | Tang | B25J 11/0005 |
| 2020/0065391 | A1* | 2/2020 | Dewan | H04L 51/02 |
| 2020/0342648 | A1* | 10/2020 | Shimizu | G06F 3/0481 |

FOREIGN PATENT DOCUMENTS

| CN | 105378707 A | 3/2016 |
| CN | 106250855 A | 12/2016 |
| CN | 106503646 A | 3/2017 |
| CN | 107340865 A | 11/2017 |

* cited by examiner

METHOD, DEVICE AND COMPUTER READABLE STORAGE MEDIUM FOR PRESENTING EMOTION

CROSS-REFERENCE TO RELATED APPLICATIONS

The present application is a continuation of U.S. patent application Ser. No. 16/052,345, filed on Aug. 1, 2018, which claims priority to Chinese Patent Application No. 201711285485.3, filed on Dec. 7, 2017, Chinese Patent Application No. 201711327146.7, filed on Dec. 13, 2017, Chinese Patent Application No. 201711327784.9, filed on Dec. 13, 2017, Chinese Patent Application No. 201711328629.9, filed on Dec. 13, 2017, and Chinese Patent Application No. 201711328630.1, filed on Dec. 13, 2017, the entire contents of which are incorporated herein by reference.

TECHNICAL FIELD

The present disclosure generally relates to the field of natural language processing and artificial intelligence technologies, and more particularly, to a method, device and computer readable storage medium for presenting an emotion.

BACKGROUND

With the continuous development of artificial intelligence technology and the continuous improvement of interactive experience requirements, some traditional man-machine interaction modes have gradually been replaced by intelligent interaction modes, and thus the intelligent interaction modes have become the focus of research.

At present, the prior art mainly focuses on identifying emotional signals to obtain an emotional state, or presenting a similar or opposite emotion only by observing a user's expressions, movements, or the like, and thus a presentation mode is single and user experience is poor.

SUMMARY

In view of this, embodiments of the present disclosure provide a method, device and computer readable storage medium for presenting an emotion, which may solve above technical problems.

According to a first aspect of the present disclosure, there is provided a method for presenting an emotion of a robot with an intelligent interaction function, including: obtaining a first emotion presentation instruction for emotion information, wherein the first emotion presentation instruction includes at least one first emotion presentation modality and at least one emotional style, the at least one first emotion presentation modality includes a text emotion presentation modality, and the at least one first emotion presentation modality belongs to part or all of multiple emotion presentation modalities of the robot; and present, by an emotion output device of the robot, an emotion corresponding to one or more of the at least one emotional style in response to the emotion information, according to each of the at least one first emotion presentation modality.

According to a second aspect of the present disclosure, there is provided a device with an intelligent interaction function for presenting an emotion, including: a processor; and a memory for storing instructions executable by the processor; wherein the processor is configured to: obtain a first emotion presentation instruction for emotion information, wherein the first emotion presentation instruction includes at least one first emotion presentation modality and at least one emotional style, the at least one first emotion presentation modality includes a text emotion presentation modality, and the at least one first emotion presentation modality belongs to part or all of multiple emotion presentation modalities of the robot; and present, by an emotion output device of the robot, an emotion corresponding to one or more of the at least one emotional style in response to the emotion information, according to each of the at least one first emotion presentation modality.

According to a third aspect of the present disclosure, there is provided a computer readable storage medium storing computer executable instructions that, when executed by a processor of a device with an intelligent interaction function for presenting an emotion, cause the device to perform a method comprising: obtaining a first emotion presentation instruction for emotion information, wherein the first emotion presentation instruction comprises at least one first emotion presentation modality and at least one emotional style, the at least one first emotion presentation modality comprises a text emotion presentation modality, and the at least one first emotion presentation modality belongs to part or all of multiple emotion presentation modalities of the robot; and presenting, by an emotion output device of the robot, an emotion corresponding to one or more of the at least one emotional style in response to the emotion information, according to each of the at least one first emotion presentation modality.

According to technical solutions provided by embodiments of the present disclosure, by obtaining a first emotion presentation instruction, wherein the first emotion presentation instruction includes at least one first emotion presentation modality and at least one emotional style, and the at least one first emotion presentation modality includes a text emotion presentation modality; and presenting an emotion corresponding to one or more of the at least one emotional style according to each of the at least one first emotion presentation modality, text-based multi-modal emotion presentation modes can be realized, and thus user experience can be improved.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The technical solutions according to the embodiments of the present invention are to be clearly described in the following with reference to the accompanying drawings in the embodiments of the present invention. It is obvious that the embodiments to be described are a part, rather than all, of the embodiments of the present invention. All other embodiments obtained by persons skilled in the art based on the embodiments of the present invention without creative efforts shall fall within the protection scope of the present invention.

Emotion presentation is a final manifestation of an affective computing user interface, and is a result of emotion analysis recognition and emotion intention understanding (analysis). The emotion presentation can provide an intelligent emotional feedback according to a current state of a user and an emotion presentation instruction decision process, and provide the intelligent emotional feedback to the user through an emotion output device.

Figure 1:
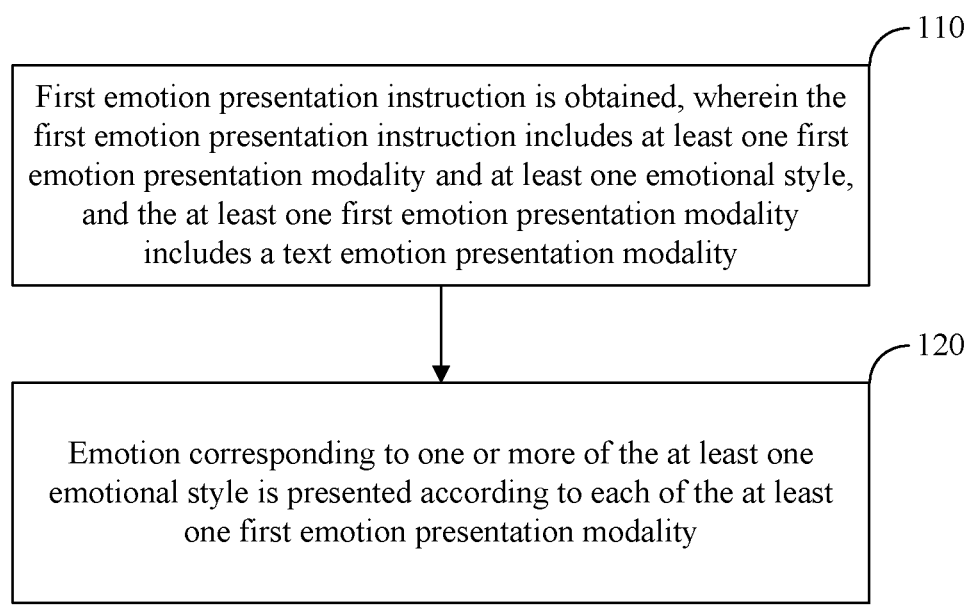
FIG. 1 is a flowchart of a method for presenting an emotion according to an exemplary embodiment of the present disclosure.

FIG. 1 is a flowchart of a method for presenting an emotion according to an exemplary embodiment of the present disclosure. As shown in FIG. 1, the method for presenting an emotion may include the following steps.

In step 110, a first emotion presentation instruction is obtained, wherein the first emotion presentation instruction includes at least one first emotion presentation modality and at least one emotional style, and the at least one first emotion presentation modality includes a text emotion presentation modality.

In the embodiment of the present disclosure, the first emotion presentation instruction may be obtained by analyzing and identifying emotion information, or may also be directly determined by setting manually, and the present disclosure is not limited thereto. For example, when a particular emotion needs to be presented, a robot may directly present the particular emotion by using the emotion presentation instruction having been set manually without identifying the user's emotions.

Methods for inputting emotion information may include, but are not limited to, one or more of a text, a voice, an image, a gesture, and the like. For example, the user may input the emotion information only in the form of the text, or may also input the emotion information in a combination of the text and the voice, or may even extract the emotion information such as facial expressions, pronunciation and intonation, and body movements of the user through a collection device.

The first emotion presentation instruction is an output result of the emotion intention understanding and an emotion presentation instruction decision in the affective computing user interface, and the first emotion presentation instruction should have a clear executable meaning and should be easily understood and accepted. Contents of the first emotion presentation instruction may include at least one first emotion presentation modality and at least one emotional style.

The first emotion presentation modality may include a text emotion presentation modality, or may also include at least one of a voice emotion presentation modality, an image emotion presentation modality, a video emotion presentation modality and a mechanical motion emotion presentation modality, and the present disclosure is not limited thereto. It should be noted that the final emotion presentation may be only one emotion presentation modality, such as the text emotion presentation modality; or may be a combination of several emotional modalities, such as the combination of the text emotion presentation modality and the voice emotion presentation modality, or the combination of the text emotion presentation modality, the voice emotion presentation modality, and the image emotion presentation modality.

The emotional style (also known as emotional component) may be represented by a classified emotion model and a dimensional emotion model. An emotional state of the classified emotion model is discrete, and thus the classified emotion model is also referred to as a discrete emotion model. A region and/or a set of at least one point in a multi-dimensional emotional space may be defined as an emotional style in the classified emotion model. The dimensional emotion model is used to construct a multi-dimensional emotional space, each dimension of the multi-dimensional emotional space corresponds to an emotional factor defined by psychology. According to the dimensional emotion model, the emotional state is represented by coordinate values in the multi-dimensional emotional space. In addition, the dimensional emotion model may be continuous or discrete.

The discrete emotion model is a main form and a recommended form of the emotional style, and emotions presented by the emotion information may be classified by the discrete emotion model according to fields or application scenarios, and emotional styles of different fields or different application scenarios may be the same or different. For example, in the general field, a basic emotional classification system is generally used as a dimensional emotion model, that is, the multi-dimensional emotional space includes six dimensions, such as joy, sadness, anger, surprise, fear, and disgust. In the field of customer service, the commonly-used emotional styles may include, but are not limited to, joy, sadness, comfort, dissuasion, and the like. In the field of companion and care, the commonly-used emotional styles may include, but are not limited to, joy, sadness, curiousness, comfort, encouragement, dissuasion, and the like.

The dimensional emotion model is a supplementary method of the emotional style. The dimensional emotion mode is only used for continuous dynamic changes and subsequent emotional calculations at present, for example, a fine-tuning of parameters needs to be performed in real time; or the dimensional emotion mode is used for a case of greatly affecting calculations of contextual emotional states. The dimensional emotion model is convenient for the calculations and the fine-tuning, but needs to be utilized by matching with presented application parameters.

In addition, each field has a major concerned emotional style (emotions of user information are identified to obtain emotional styles concerned in the field) and a major presented emotional style (emotional styles in the emotion presentation or interactive instruction), both of which may be two different sets of emotional classifications (such as the classified emotion model) or different ranges of emotional dimensions (such as the dimensional emotion model). In an application scenario, the major presented emotional style corresponding to the major concerned emotional style in the field is determined by the emotion presentation instruction decision process.

If the first emotion presentation instruction includes a plurality of emotion presentation modalities, the text emotion presentation modality is preferentially used to present the at least one emotional style, and then the at least one emotional style is supplementary presented by using one or more of the voice emotion presentation modality, the image emotion presentation modality, the video emotion presentation modality and the mechanical motion emotion presentation modality. The supplementary presented emotional style may be at least one emotional style that is not presented by the text emotion presentation modality, or at least one emotional style that the emotional intensity and/or the emotional polarity presented by the text emotion presentation modality does not meet requirements of the first emotion presentation instruction.

It should be noted that the first emotion presentation instruction may specify one or more emotional styles, and the emotional styles may be sequenced according to an intensity of each emotional style, so as to determine a primary and secondary relation of each emotional style in the emotion presentation process. Specifically, if the emotional intensity of the emotional style is less than a preset emotional intensity threshold, it could be considered that the emotional intensity of the emotional style in the emotion presentation process is not greater than emotional intensities of other emotional styles in the first emotion presentation instruction, wherein the emotional intensities of the other emotional styles are greater than or equal to the emotional intensity threshold.

In step 120, an emotion corresponding to one or more of the at least one emotional style is presented according to each of the at least one first emotion presentation modality.

In the embodiment of the present disclosure, a selection of the emotion presentation modality depends on following factors: an emotion output device and an application state thereof (for example, whether the emotion output device has a display for displaying the text or the image, or whether the emotion output device is connected to a speaker, and the like), types of interaction scenarios (for example, daily chat, business consulting, and the like), types of conversations (for example, answers to common questions are mainly based on the text, and a Global Position System (GPS) is based on the image and is supplemented by the voice).

Further, an output mode of the emotion presentation depends on the emotion presentation modality. For example, if the first emotion presentation modality is the text emotion presentation modality, the final output mode of the emotion presentation is the text; and if the first emotion presentation modality is based on the text emotion presentation modality and is supplemented by the voice emotion presentation, the final output mode of the emotion presentation is a combination of the text and the voice. That is, the output mode of the emotion presentation can only include one emotion presentation modality, or can also include a combination of several emotion presentation modalities, and the present disclosure is not limited thereto.

According to technical solutions provided by embodiments of the present disclosure, by obtaining a first emotion presentation instruction, wherein the first emotion presentation instruction includes at least one first emotion presentation modality and at least one emotional style, and the at least one first emotion presentation modality includes a text emotion presentation modality, and presenting an emotion corresponding to one or more of the at least one emotional style according to each of the at least one first emotion presentation modality, text-based multi-modal emotion presentation modes can be realized, and thus user experience can be improved.

In another embodiment of the present disclosure, the presenting an emotion corresponding to one or more of the at least one emotional style according to each of the at least one first emotion presentation modality includes: searching in an emotion presentation database according to the at least one emotional style to determine at least one emotional vocabulary corresponding to each of the at least one emotional style; and presenting the at least one emotional vocabulary.

Specifically, the emotion presentation database may be preset manually, or may be obtained through a big data learning, or may also be obtained by a semi-supervised learning and semi-artificial semi-supervised man-machine cooperation, or may even be obtained through training a whole interactive system based on a large number of emotional dialog data. It should be noted that the emotion presentation database allows online learning and updating.

Emotional vocabularies and parameters of the emotional style, the emotional intensity, and the emotional polarity of the emotional vocabularies may be stored in the emotion presentation database, or may be obtained by an external interface. In addition, the emotion presentation database includes a set of emotional vocabularies of multiple application scenarios and corresponding parameters. Therefore, the emotional vocabularies may be switched and adjusted according to a practical application.

The emotional vocabularies may be classified according to emotional states of users concerned in the application scenarios. That is, the emotional style, the emotional intensity and the emotional polarity of the same emotional vocabulary are related to the application scenarios. For example, in the general field without special application requirements, Chinese emotional vocabularies may be classified according to the above six basic emotional styles, and thus the emotional styles and corresponding examples and phrases shown in Table 1 are obtained.

TABLE 1

| No. | Emotional style | Example words |
| --- | --- | --- |
| 1 | joy | happy, good, excitement, happiness, perfect, . . . |
| 2 | sadness | grief, distress, depression, heartbreak, . . . |
| 3 | anger | indignation, annoyed, irritated, rage, . . . |
| 4 | surprise | strange, astonishment, make a great coup, jaw-dropping, . . . |
| 5 | fear | bewilderment, panicked, in bewilderment, tremble with fear, . . . |
| 6 | disgust | dislike, hateful, aversion, antipathy, blame, apologetic, . . . |

It should be noted that example words in Table 1 are recommended example words, which are divided based on the major emotional styles of the emotional vocabularies in the application scenarios of the general field. The above six emotional styles are not fixed. In the practical application, the emotional styles of the emotional vocabularies may be adjusted according to the application scenarios, for example, an emotional style paying special attention to is added, or an emotion style without special application is deleted.

In addition, the same emotional vocabulary may have different paraphrases in different contexts to express different emotions; that is, the emotional style and the emotional polarity can be changed. Therefore, the same emotional vocabulary needs to be performed an emotion disambiguation according to the application scenarios and the contexts to determine the emotional style of the emotional vocabulary.

Specifically, an emotion annotation of the Chinese emotional vocabulary is performed by an automatic mode, a manual mode, or a combination of the automatic mode and the manual mode. For vocabularies with multiple emotional styles, the emotion disambiguation may be performed based on part of speech, emotional frequency, Bayesian model, and the like. In addition, the emotional style of the emotional vocabulary in the context may also be determined by constructing a context-sensitive characteristic set.

In another embodiment of the present disclosure, the each of the at least one emotional style corresponds to a plurality of emotional vocabularies, and the first emotion presentation instruction further includes: emotional intensity corresponding to the each of the at least one emotional style and/or emotional polarity corresponding to the each of the at least one emotional style, wherein the searching in an emotion presentation database according to the at least one emotional style to determine at least one emotional vocabulary corresponding to each of the at least one emotional style includes: selecting the at least one emotional vocabulary from the plurality of emotional vocabularies according to the emotional intensity and/or the emotional polarity.

Specifically, each emotional style may correspond to a plurality of emotional vocabularies. Contents of the first emotion presentation instruction may further include an emotional intensity corresponding to each emotional style and/or an emotional polarity corresponding to each emotional style, and at least one emotional vocabulary is selected from the plurality of emotional vocabularies according to the emotional intensity and/or the emotional polarity.

The emotional intensity is derived from a tendency of things selected by a person, and is a factor for describing emotions in psychology. In the present disclosure, the emotional intensity is used to describe levels of the emotions. The emotional intensity may be set to different emotional intensity levels, for example, level 2 (i.e., with emotional intensity and no emotional intensity), level 3 (i.e., low emotional intensity, moderate emotional intensity, and high emotional intensity), or higher level, according to the application scenarios, and the present disclosure is not limited thereto.

In a particular application scenario, there is a one-to-one correspondence between the emotional style and emotional intensity of the same emotional vocabulary. In the practical application, the emotional intensity of the first emotion presentation instruction is firstly divided, since the emotional intensity determines the emotional intensity level finally presented by the emotion presentation; secondly, the intensity level of the emotional vocabulary is determined according to the emotional intensity level of the first emotion presentation instruction. It should be noted that the emotional intensity of the present disclosure is determined by the emotion presentation instruction decision process. In addition, it should also be noted that the emotional intensity level needs to match with the emotional intensity level of the first emotion presentation instruction, and a correspondence between the emotional intensity level and the emotional intensity level of the first emotion presentation instruction may be obtained by an operational rule.

The emotional polarity may include one or more of commendatory, derogatory and neutral. Each emotional style specified by the first emotion presentation instruction corresponds to one or more emotional polarities. Specifically, taking the emotional style "disgust" in Table 1 as an example, in the example words corresponding to the emotional style of "disgust", the emotional polarity of "blame" is derogatory, and the emotional polarity of "apologetic" is neutral. It should be noted that the emotional polarity of the present disclosure is determined by the emotion presentation instruction decision process, which may be a decision process of outputting a presentation instruction according to one or more of the user's information, such as the emotional states, the interaction intentions, the application scenarios, and the like. In addition, the emotion presentation instruction decision process may also be a process of adjusting the emotional polarity according to the application scenarios and the user's requirements and actively determining the emotion presentation instruction if the user's emotional states and intention information are not obtained. For example, no matter how the user's states and intents, a guiding robot could present a "joyful" emotion.

In another embodiment of the present disclosure, the at least one emotional vocabulary is divided into different levels according to different emotional intensities.

Specifically, the level of the emotional vocabulary is finer than the level of the emotional intensity specified by the first emotion presentation instruction. Such presentation rules are less demanding and the results are more likely to converge. That is, the level of the emotional vocabulary is more than the level of the emotional intensity, however, the emotional vocabulary may correspond to the emotional intensity specified by the first emotion presentation instruction through an operational rule, and may not exceed an upper limit and a lower limit of the emotional intensity level specified by the first emotion presentation instruction.

For example, if the emotional intensity levels given by the first emotion presentation instruction are level 0 (low), level 1 (middle), and level 2 (high), and the levels of the emotional vocabularies are level 0, level 1, level 2, level 3, level 4, and level 5, the emotional intensity (i.e., level 0 to level 5) of the emotional vocabulary in the current text needs to be matched with the emotional intensity (i.e., level 0 to level 2) of the first emotion presentation instruction based on the operational rules, and does not exceed a range of the emotional intensity of the first emotion presentation instruction. If there is level "−1" or level 3, it means that the emotional intensity of the emotional vocabulary has exceeded the range of the emotional intensity of the first emotion presentation instruction, and thus the matching rule or the level of the emotional intensity is unreasonable.

It should be noted that, in general, the emotional intensity of the emotion presentation instruction is firstly divided, because the emotional intensity determines the level of the emotional intensity finally presented by the emotion presentation. Further, after the level of the emotional intensity of the emotion presentation instruction is determined, the intensity level of the emotional vocabulary is determined.

In another embodiment of the present disclosure, each of the at least one emotional vocabulary includes one or more emotional styles, and the same emotional vocabulary of the at least one emotional vocabulary has different emotional styles and different emotional intensities in different application scenarios.

Specifically, each emotional vocabulary has one or more emotional styles, and the same emotional vocabulary may have different emotional styles and emotional intensities in different application scenarios. Taking the emotional vocabulary "good" as an example, in the case that the emotional style is "joy", the emotional intensity of the emotional vocabulary "good" is commendatory; and in the case that the emotional style is "anger", the emotional intensity of the emotional vocabulary "good" is derogatory.

In addition, the same emotional vocabulary may have different interpretations in different contexts to express different emotions; that is, the emotion style and the emotional polarity may be changed. Therefore, the same emotional vocabulary needs to be performed an emotion disambiguation according to the application scenarios and the contexts to determine the emotional style of the emotional vocabulary.

Specifically, an emotion annotation of the Chinese emotional vocabulary is performed by an automatic mode, a manual mode, or a combination of the automatic mode and the manual mode. For vocabularies having multiple emotional styles, the emotion disambiguation may be performed based on part of speech, emotional frequency, Bayesian model, and the like. In addition, the emotional style of the emotional vocabulary in the context may also be determined by constructing a context-sensitive characteristic set.

In another embodiment of the present disclosure, the emotional vocabulary is a multiple emotional vocabulary, and the multiple emotional vocabulary includes a combination of a plurality of vocabularies, and each of the multiple emotional vocabulary has no separate emotional style attribute.

Specifically, the vocabulary itself may not have an emotional style, but a combination of several vocabularies, which is called the multiple emotional vocabulary, may have the emotional style, and may be used to convey emotion information. The multiple emotional vocabulary may be obtained from a preset emotional semantic database, or may be obtained through a preset logic rule or an external interface, and the present disclosure is not limited thereto.

In another embodiment of the present disclosure, the method for presenting the emotion further includes: presenting an emotion corresponding to an emotional style unspecified by the first emotion presentation instruction according to each of the at least one first emotion presentation modality, wherein emotional intensity corresponding to the unspecified emotional style is lower than the emotional intensity corresponding to the at least one emotional style, or emotional polarity corresponding to the unspecified emotional style is consistent with the emotional polarity of the at least one emotional style.

Specifically, in addition to the emotional style specified in the first emotion presentation instruction, the emotional intensities of other emotional styles in the text obtained according to a preset correspondence of the emotional intensity or a formula are lower than all emotional intensities of the emotional styles specified in the first emotion presentation instruction. That is, emotional intensities corresponding to unspecified emotional styles do not affect the emotion presentation of various emotional styles in the first emotion presentation instruction.

In another embodiment of the present disclosure, the method for presenting the emotion further includes: determining a value of emotional intensity corresponding to at least one emotional style in an emotion presentation text composed of the at least one emotional vocabulary; and determining whether the emotional intensity corresponding to the at least one emotional style conforms to the first emotion presentation instruction according to the value of the emotional intensity, wherein emotional intensity corresponding to the i-th emotional style in the emotion presentation text is calculated by the following formula: $\text{round}[n/N*1/[1+\exp(-n+1)]*\max\{a1, a2, \ldots, an\}]$, wherein round [X] represents rounding off X, n represents the number of emotional vocabularies corresponding to the i-th emotional style, N represents the number of emotional vocabularies in the emotion presentation text, M represents the number of emotional styles corresponding to the N emotional vocabularies, $\exp(x)$ represents an exponential function with a natural constant e as a base, a1, a2, . . . , an represent emotional intensities of the n emotional vocabularies respectively corresponding to an emotional style M, $\max\{a1, a2, \ldots, an\}$ represents the maximum value of the emotional intensities, wherein the n, N and M are positive integers.

Specifically, in the above formula, let N=5, M=1, n=5 and $\max\{a1, a2, a3, a4, a5\}=5$, the emotional intensity of the emotional style equals to 5. Here, N=5 means that there are five emotional vocabularies in the text, and M=1 means that the five emotional vocabularies have only one emotional style. Therefore, the emotional intensity of the emotional style in the text may be obtained by only one calculation.

Optionally, in the above formula, let N=5 and M=3, for an emotion A, if n=3 and $\max\{a1, a2, a3\}=4$, an emotional intensity of an emotional style of the emotion A equals to 2; for an emotion B, if n=1 and $\max\{b1\}=4$, an emotional intensity of an emotional style of the emotion B equals to 1; for an emotion C, if n=1 and $\max\{c1\}=2$, an emotional intensity of an emotional style of the emotion C equals to 0. Here, N=5 means that there are five emotional vocabularies in the text, and M=3 means that the five emotional vocabularies have three emotional styles. Therefore, it is necessary to calculate three times to obtain the emotional intensity of the emotional style of the text.

At the same time, an emotional polarity of the i-th emotional style in the text may be calculated by the following formula:

$$B=\text{Sum}(x1*(a1/\max\{a\}), x2*(a2/\max\{a\}), \ldots, xn*(an/\max\{a\}))/n,$$

wherein Sum(X) represents that X may be summed, $\max\{a\}$ represents the maximum emotional intensity of all emotional vocabularies of the emotional style M, a1, a2, . . . , an represent emotional intensities of n emotional vocabularies of the emotional style M, x1, x2, . . . , xn represent emotional polarities of n emotional vocabularies of the emotional style M.

It should be noted that the above formula needs to calculate each emotional style M, so as to obtain the emotional polarity corresponding to the emotional style.

Further, if B>0.5, it means that the emotional polarity is commendatory; if B<-0.5, it means that the emotional polarity is derogatory; and if 0.5≥B≥-0.5, it means that the emotional polarity is neutral.

It should be noted that the emotional polarity may be quantitatively expressed as: "+1" represents commendatory, "-1" represents derogatory, and "0" represents neutral; or the emotional polarity may be adjusted as needed. In addition, it should also be noted that no dramatic changes in the emotional polarity of the emotional style are allowed, for example, commendatory becomes derogatory, or derogatory becomes commendatory.

In another embodiment of the present disclosure, the presenting an emotion corresponding to one or more of the at least one emotional style according to each of the at least one first emotion presentation modality includes: presenting an emotion according to the at least one first emotion presentation modality, if the at least one first emotion presentation modality conforms to an emotion presentation condition.

Specifically, the first emotion presentation modality conforms to the emotion presentation condition means that both the emotion output device and the user output device support modes presented by the first emotion presentation modality, for example, text, voice, picture, and the like. Taking a customer service of a bank as an example. If a user wants to ask the address of a bank, an emotional strategy module firstly generates a first emotion presentation instruction based on the user's emotion information, the first emotion presentation instruction may include that a major presentation mode of the first emotion presentation modality is "text", and a secondary presentation modes of the first emotion presentation modality are "image" and "voice". Secondly, the emotion output device and the user output device are detected, and if it is detected that both the emotion output device and the user output device support above three presentation modes such as text, image and voice, the address of the bank is presented to the user in the form of basing on the text and supplementing by image and voice.

In another embodiment of the present disclosure, the method for presenting an emotion further includes: generating a second emotion presentation instruction according to the first emotion presentation, wherein the second emotion presentation instruction includes at least one second emotion presentation modality, and the at least one second emotion presentation modality is obtained by adjusting the at least one first emotion presentation modality, if it is determined that the at least one first emotion presentation modality does not conform to the emotion presentation condition; and presenting an emotion according to the at least one second emotion presentation modality.

Specifically, at least one first emotion presentation modality does not conform to the emotion presentation condition means that at least one of the emotion output device and the user output device does not support a presentation mode of the first emotion presentation modality, or the presentation mode of the first emotion presentation modality needs to be temporarily changed according to dynamic changes (for example, a failure of the output device, changes of user requirements, dynamic changes of a background control and/or changes of application scenario requirements, and the like). At this time, at least one first emotion presentation modality needs to be adjusted to obtain at least one second emotion presentation modality, and the emotion is presented based on at least one second emotion presentation modality.

The process of adjusting at least one first emotion presentation modality may be referred to as a secondary adjustment of the emotion presentation modality, and the secondary adjustment may temporarily adjust the output strategy and priority of the emotion presentation modality according to the dynamic changes to troubleshoot problems and optimize and give preference to the emotion presentation modality.

At least one second emotion presentation modality may include at least one of a text emotion presentation modality, a voice emotion presentation modality, an image emotion presentation modality, a video emotion presentation modality, and a mechanical motion emotion presentation modality.

In another embodiment of the present disclosure, if it is determined that the at least one first emotion presentation modality does not conform to the emotion presentation condition, the generating a second emotion presentation instruction according to the first emotion presentation instruction includes: if it is detected that the failure of a user output device affects the presentation of the first emotion presentation modality or the user output device does not support the presentation of the first emotion presentation modality, determining that the at least one first emotion presentation modality does not conform to the emotion presentation condition; and adjusting the at least one first emotion presentation modality in the first emotion presentation instruction to obtain the at least one second emotion presentation modality in the second emotion presentation instruction.

Specifically, at least one first emotion presentation modality does not conform to the emotion presentation condition may include, but is not limited to, the failure of the user output device affects the presentation of the first emotion presentation modality, or the user output device does not support the presentation of the first emotion presentation modality, and the like. Therefore, if it is determined that at least one first emotion presentation modality does not conform to the emotion presentation condition, at least one first emotion presentation modality in the first emotion presentation instruction needs to be adjusted to obtain at least one second emotion presentation modality in the second emotion presentation instruction.

Herein, still taking the customer service of the bank as an example, if the user wants to ask the address of a bank, the emotional strategy module firstly generates the first emotion presentation instruction based on the user's emotion information, the first emotion presentation instruction may include that a major presentation mode of the first emotion presentation modality is "text", the secondary presentation modes of the first emotion presentation modality are "image" and "voice", the emotional style is "pleasure", and the emotional intensity is "medium". Secondly, the emotion output device and the user output device are detected, if it is detected that the user output device does not support the presentation mode of picture (i.e., a map), it means that the first emotion presentation modality does not conform to the emotion presentation condition. In this case, the first emotion presentation modality needs to be adjusted to obtain the second emotion presentation modality. The major presentation mode of the second emotion presentation modality is "text", the secondary presentation mode of the second emotion presentation modality is "voice", the emotional style is "pleasure", and the emotional intensity is "medium". Finally, the address of the bank is presented to the user in the form of basing on the text, supplementing by voice, and the user is prompted that the map cannot be displayed or the map is not displayed successfully, and the user may view the map through other devices.

Optionally, as another embodiment of the present disclosure, if it is determined that the at least one first emotion presentation modality does not conform to the emotion presentation condition, the generating a second emotion presentation instruction according to the first emotion presentation instruction includes: determining that the at least one first emotion presentation modality does not conform to the emotion presentation condition according to changes of user requirements, dynamic changes of a background control and/or changes of application scenario requirements; and adjusting the at least one first emotion presentation modality in the first emotion presentation instruction to obtain the at least one second emotion presentation modality in the second emotion presentation instruction.

Specifically, at least one first emotion presentation modality does not conform to the emotion presentation condition may further include, but is not limited to, changes of the user requirements, dynamic changes of the background control and/or changes of the application scenario requirements. Therefore, if it is determined that at least one first emotion presentation mode does not meet the emotion presentation condition, at least one first emotion presentation modality in the first emotion presentation instruction needs to be adjusted to obtain at least one second emotion presentation modality in the second emotion presentation instructions.

Herein, still taking the customer service of the bank as an example. If the user wants to ask the address of a bank, the emotional strategy module firstly generates the first emotion presentation instruction based on the user's emotion information, the first emotion presentation instruction may include that the major presentation mode of the first emotion presentation modality is "text", and the secondary presentation mode of the first emotion presentation instruction is "voice", the emotional style is "pleasure", and the emotional intensity is "medium". Secondly, when receiving a request of the user that the address of the bank needs to be displayed in the form of a combination of text and map, it is determined that the first emotion presentation modality does not conform to the emotion presentation condition, and the first emotion presentation modality is correspondingly adjusted to obtain a second emotion presentation modality, the major presentation mode of the second emotion presentation modality is "text", the secondary presentation mode of the second emotion presentation modality is "image", the emotional style is "pleasure", and the emotional intensity is "medium". Finally, the address of the bank is presented to the user in the form of basing on the text and supplementing by image.

For the emotion presentation that does not conform to the emotion presentation instruction, a feedback needs to be provided to a dialog system, so that the dialog system may readjust the output and make a determination again until the outputted text conforms to the emotion presentation instruction. The feedback adjustment of the dialogue system may include, but is not limited to, the following two methods: one is to directly adjust and replace individual emotional vocabularies in a current sentence without adjusting the form of the sentence, so as to meet emotion presentation standards of the emotion presentation instruction, this method is suitable for a situation that there is a little difference between the emotional style and the emotional intensity; the other is to regenerate a sentence by the dialogue system, this method is suitable for a situation that there is a considerable difference between the emotional style and the emotional intensity.

It should be noted that the first emotion presentation modality of the present disclosure is mainly based on the text emotion presentation modality, but may present the emotion by selecting or adding the voice emotion presentation modality, the image emotion presentation modality, the video emotion presentation modality, the mechanical motion emotion presentation modality according to the user requirements, the application scenarios, and the like.

Specifically, the voice emotion presentation modality may include a text-based voice broadcast, and may also include a voice-based music, a voice-based sound, and the like, and the present disclosure is not limited thereto. At this time, the emotion presentation database not only stores emotional vocabularies (which are used to analyze the emotional style of the text corresponding to the voice) corresponding to different emotional styles in the application scenarios, but also needs to include audio parameters (for example, fundamental frequency, formant, energy feature, harmonic to noise ratio, pronunciation frame number feature, Mel-frequency cepstral coefficient, and the like) corresponding to the different emotional styles, or audio features and their parameters corresponding to specific emotional styles extracted by training.

Further, the emotional style of the voice broadcast is derived from two parts, namely, an emotional style A of a broadcast text and an emotional style B of an audio signal, and the emotional style of the voice broadcast is a combination of the emotional style A and the emotional style B. For example, an average value (or summation operations with weight) of the emotional style and the emotional intensity of A and the emotional style and the emotional intensity of B is the emotional style and the emotional intensity of the voice broadcast. A sound (including a music or a sound without text information) may be classified based on a variety of audio parameters, or a part of audio data of the sound may be manually labeled, and then features may be extracted by supervised learning to determine the emotional style and the emotional intensity of the sound.

The image emotion presentation modality may include, but is not limited to, a face, a picture emoticon, an icon, a pattern, an animation, a video, or the like. At this time, image parameters corresponding to the different emotional styles needs to be stored in the emotion presentation database. The image emotion presentation modality may obtain the emotional style and the emotional intensity of image data by automatically detecting and combining with the manual manner, or may also extract features by the supervised learning to determine the emotional style and the emotional intensity of the image.

The mechanical motion emotion presentation modality may include, but is not limited to, activities and movements of various parts of the robot, mechanical movements of various hardware output devices, and the like. At this time, activity and motion parameters corresponding to the different emotional styles needs to be stored in the emotion presentation database. These parameters may be stored in the database in advance, or may also be extended and updated through online learning, and the present disclosure is not limited thereto. After receiving the emotion presentation instruction, the mechanical motion emotion presentation modality may select and implement an appropriate activity and exercise plan according to the emotional style and the emotional intensity. It should be noted that the output of the mechanical motion emotion presentation modality needs to consider security problems.

All of the above optional technical solutions can be combined in any way to form optional embodiments of the present disclosure, and detailed descriptions are not provided herein.

Figure 2:
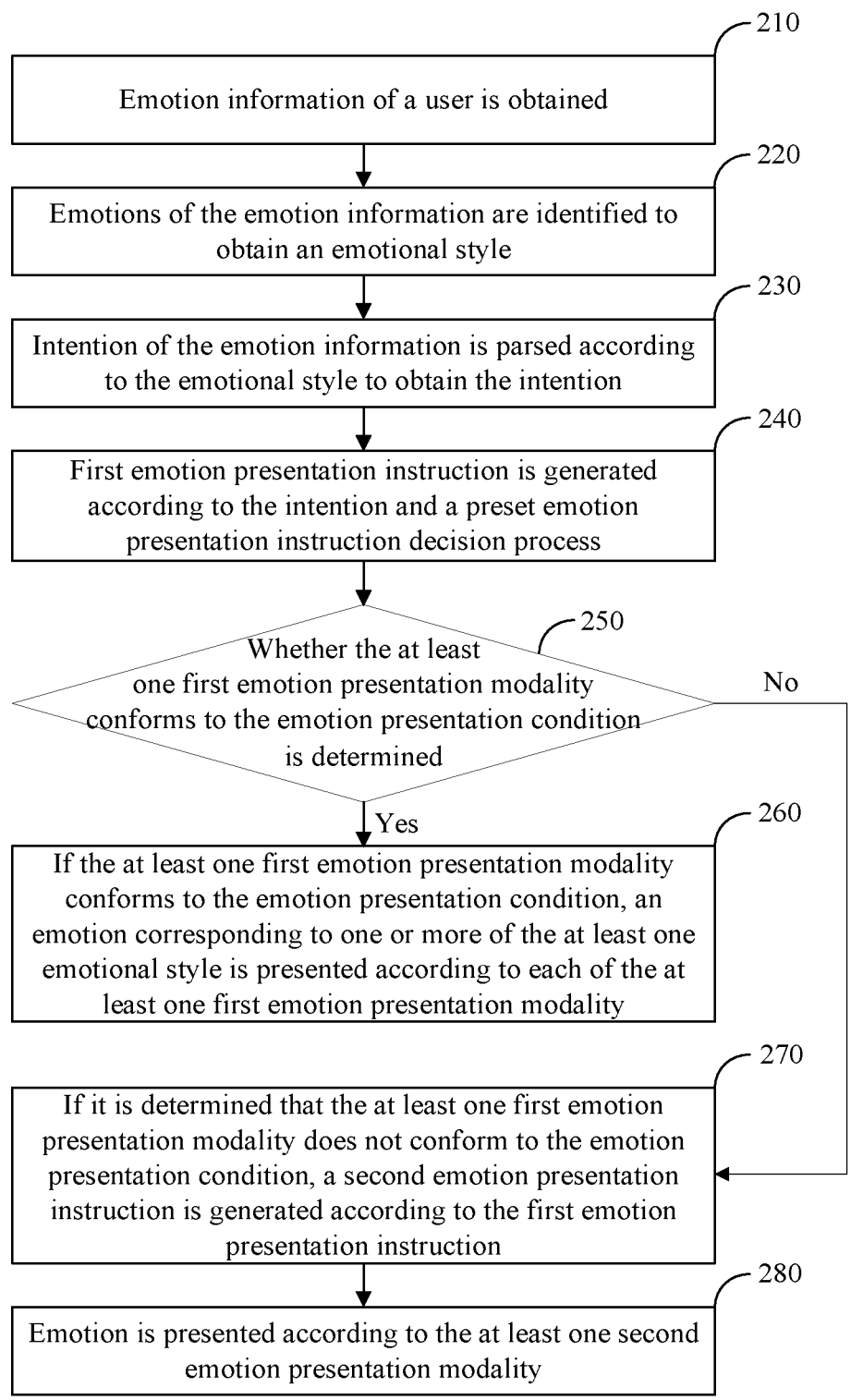
FIG. 2 is a flowchart of a method for presenting an emotion according to another exemplary embodiment of the present disclosure.

FIG. 2 is a flowchart of a method for presenting an emotion according to another exemplary embodiment of the present disclosure. As shown in FIG. 2, the method for presenting an emotion may include the following steps.

In step 210, emotion information of a user is obtained.

In the embodiment of the present disclosure, the user's emotion information may be obtained by means of text, voice, image, gesture, and the like.

In step 220, emotions of the emotion information are identified to obtain an emotional style.

In the embodiment of the present disclosure, word segmentation is performed to the emotion information according to a preset word segmentation rule to obtain a plurality of emotional vocabularies. The word segmentation rule may include any one of a forward maximum matching method, an inverse maximum matching method, a word-by-word traversal method, and a word frequency statistical method. The word segmentation may use one or more of a bidirectional maximum matching method, a Viterbi algorithm, a Hidden Markov Model (HMM) algorithm, and a Conditional Random Field (CRF) algorithm.

Then, a similarity calculation is performed between the plurality of emotional vocabularies and a plurality of preset emotional vocabularies stored in an emotional vocabulary semantic database, and the most similar emotional vocabulary is used as a matched emotional vocabulary.

Specifically, if emotional vocabularies in the text are also in the emotional vocabulary semantic database, emotional styles and emotional intensities corresponding to the emotional vocabularies are directly extracted. If emotional vocabularies in the text are not in the emotional vocabulary semantic database, the word segmentation is performed to the emotional vocabularies, and then the similarity calculation is performed between the emotional vocabularies and contents in the emotional vocabulary semantic database according to results of the word segmentation. Alternatively, an attention mechanism may be added, for example, several key vocabularies are selected according to the results of the word segmentation, and then the similarity calculation is performed between the several key vocabularies and the contents in the emotional vocabulary semantic database, if a similarity exceeds a threshold, an emotional style and an emotional intensity of a vocabulary having the most similarity in the emotional vocabulary semantic database are used as the emotional intensity and the emotional style of the vocabulary. If there are no emotional vocabularies in the emotional vocabulary semantic database, or the similarity does not exceed the threshold, it is considered that the emotional vocabulary is not in the text, and thus an output of the emotional style is empty or neutral, and the emotional intensity is zero. It should be noted that the output needs to match the emotion presentation instruction decision process, that is, the emotion presentation instruction decision process includes a case that the emotional style is empty or neutral.

Herein, the similarity calculation may use a combination of one or more of the following calculation methods: Vector Space Model (VSM), Latent Semantic Indexing (LSI), attribute-based semantic similarity, and Han-based distance semantic similarity.

Further, the emotional style is obtained according to the matched emotional vocabulary. In addition to the emotional style, the emotional intensity and the emotional polarity can also be obtained.

In step 230, an intention of the emotion information is parsed according to the emotional style to obtain the intention.

In the embodiment of the present disclosure, the emotional style and the emotional intensity can be obtained based on the analysis of the intention and the preset emotion presentation instruction decision process, or the emotional polarity can also be obtained. The intention analysis may be obtained by text, or may also be obtained by capturing actions of the user, and the present disclosure is not limited thereto. Specifically, the intention may be obtained by performing the word segmentation, sentence segmentation, or vocabulary combination on the text information of the emotion information, or may be obtained based on semantic contents in the emotion information and the user information, or may also be obtained by capturing the emotion information such as the user's expressions and actions, and the present disclosure is not limited thereto.

In step 240, a first emotion presentation instruction is generated according to the intention and a preset emotion presentation instruction decision process, wherein the first emotion presentation instruction includes at least one first emotion presentation modality and at least one emotional style, and the at least one first emotion presentation modality includes a text emotion presentation modality.

In the embodiment of the present disclosure, the emotion presentation instruction decision process is a process of generating an emotion presentation instruction according to emotional states (emotional styles), intention information, context, and the like obtained by identifying the emotion.

In step 250, whether the at least one first emotion presentation modality conforms to the emotion presentation condition is determined.

In step 260, if the at least one first emotion presentation modality conforms to the emotion presentation condition, an emotion corresponding to one or more of the at least one emotional style is presented according to each of the at least one first emotion presentation modality.

In step 270, if it is determined that the at least one first emotion presentation modality does not conform to the emotion presentation condition, a second emotion presentation instruction is generated according to the first emotion presentation instruction, wherein the second emotion presentation instruction includes at least one second emotion presentation modality, and the at least one second emotion presentation modality is obtained by adjusting the at least one first emotion presentation modality.

In step 280, an emotion is presented according to the at least one second emotion presentation modality.

According to technical solutions provided by embodiments of the present disclosure, whether the first emotion presentation modality conforms to the emotion presentation condition can be determined, and the final emotion presentation modality can be adjusted based on the determination result, and thus the instantaneity can be improved and user experience can be further improved.

The following are embodiments of devices of the present disclosure, which can implement the embodiments of the methods of the present disclosure. The above descriptions regarding the embodiments of the methods also apply to the embodiments of the devices.

Figure 3:
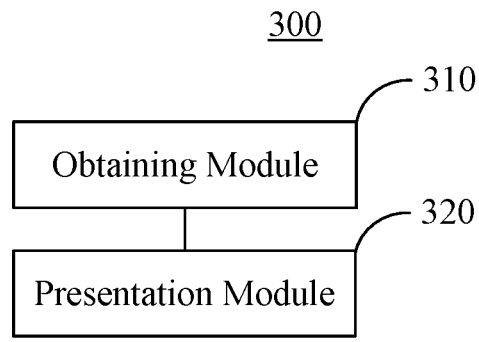
FIG. 3 is a block diagram of a device for presenting an emotion according to an exemplary embodiment of the present disclosure.

FIG. 3 is a block diagram of a device 300 for presenting an emotion according to an exemplary embodiment of the present disclosure. As shown in FIG. 3, the device 300 for presenting an emotion may include an obtaining module 310 and a presentation module 320.

The obtaining module 310 is configured to obtain a first emotion presentation instruction, wherein the first emotion presentation instruction includes at least one first emotion presentation modality and at least one emotional style, and the at least one first emotion presentation modality includes a text emotion presentation modality.

The presentation module 320 is configured to present an emotion corresponding to one or more of the at least one emotional style according to each of the at least one first emotion presentation modality.

According to technical solutions provided by embodiments of the present disclosure, by obtaining a first emotion presentation instruction, wherein the first emotion presentation instruction includes at least one first emotion presentation modality and at least one emotional style, and the at least one first emotion presentation modality includes a text emotion presentation modality, and presenting an emotion corresponding to one or more of the at least one emotional style according to each of the at least one first emotion presentation modality, text-based multi-modal emotion presentation modes can be realized, and thus user experience can be improved.

In another embodiment of the present disclosure, the presentation module 320 of FIG. 3 searches in an emotion presentation database according to the at least one emotional style to determine at least one emotional vocabulary corresponding to each of the at least one emotional style, and present the at least one emotional vocabulary.

In another embodiment of the present disclosure, the each of the at least one emotional style corresponds to a multiple of emotional vocabularies, and the first emotion presentation instruction may further include: emotional intensity corresponding to the each of the at least one emotional style and/or emotional polarity corresponding to the each of the at least one emotional style, wherein the presentation module 320 of FIG. 3 selects the at least one emotional vocabulary from the plurality of emotional vocabularies according to the emotional intensity and/or the emotional polarity.

In another embodiment of the present disclosure, the at least one emotional vocabulary is divided into different levels according to different emotional intensities.

In another embodiment of the present disclosure, each of the at least one emotional vocabulary includes one or more emotional style, and the same emotional vocabulary of the at least one emotional vocabulary has different emotional styles and different emotional intensities in different scenarios.

In another embodiment of the present disclosure, the emotional vocabulary is a multiple emotional vocabulary, and the multiple emotional vocabulary includes a combination of a plurality of vocabularies, and each of the multiple emotional vocabulary has no separate emotional style attribute.

In another embodiment of the present disclosure, the presentation module 320 of FIG. 3 presents an emotion corresponding to an emotional style unspecified by the first emotion presentation instruction according to each of the at least one first emotion presentation modality, wherein emotional intensity corresponding to the unspecified emotional style is lower than the emotional intensity corresponding to the at least one emotional style, or emotional polarity corresponding to the unspecified emotional style is consistent with the emotional polarity of the at least one emotional style.

In another embodiment of the present disclosure, the presentation module 320 of FIG. 3 determines a value of emotional intensity corresponding to at least one emotional style in an emotion presentation text composed of the at least one emotional vocabulary; and determining whether the emotional intensity corresponding to the at least one emotional style conforms to the first emotion presentation instruction according to the value of the emotional intensity, wherein emotional intensity corresponding to the i-th emotional style in the emotion presentation text is calculated by the following formula: $\text{round}[n/N*1/[1+\exp(-n+1)]*\max\{a1, a2, \ldots, an\}]$, wherein round[X] represents rounding off X, n represents the number of emotional vocabularies corresponding to the i-th emotional style, N represents the number of emotional vocabularies in the emotion presentation text, M represents the number of emotional styles corresponding to the N emotional vocabularies, exp(x) represents an exponential function with a natural constant e as a base, a1, a2, . . . , an represent emotional intensities of the n emotional vocabularies respectively corresponding to an emotional style M, max{a1, a2, . . . , an} represents the maximum value of the emotional intensities, wherein the n, N and M are positive integers.

In another embodiment of the present disclosure, the emotional polarity includes one or more of commendatory, derogatory and neutral.

In another embodiment of the present disclosure, if the at least one first emotion presentation modality conforms to an emotion presentation condition, the presentation module 320 of FIG. 3 presents an emotion according to the at least one first emotion presentation modality.

In another embodiment of the present disclosure, if it is determined that the at least one first emotion presentation modality does not conform to the emotion presentation condition, the presentation module 320 of FIG. 3 generates a second emotion presentation instruction according to the first emotion presentation, wherein the second emotion presentation instruction includes at least one second emotion presentation modality, and the at least one second emotion presentation modality is obtained by adjusting the at least one first emotion presentation modality; and presents an emotion according to the at least one second emotion presentation modality.

In another embodiment of the present disclosure, if it is detected that the failure of a user output device affects the presentation of the first emotion presentation modality or the user output device does not support the presentation of the first emotion presentation modality, the presentation module 320 of FIG. 3 determines that the at least one first emotion presentation modality does not conform to the emotion presentation condition, and adjusts the at least one first emotion presentation modality in the first emotion presentation instruction to obtain the at least one second emotion presentation modality in the second emotion presentation instruction.

In another embodiment of the present disclosure, the presentation module 320 of FIG. 3 determines that the at least one first emotion presentation modality does not conform to the emotion presentation condition according to changes of user requirements, dynamic changes of a background control, and/or changes of application scenario requirements; and adjusts the at least one first emotion presentation modality in the first emotion presentation instruction to obtain the at least one second emotion presentation modality in the second emotion presentation instruction.

In another embodiment of the present disclosure, the at least one second emotion presentation modality may include at least one of a text emotion presentation modality, a voice emotion presentation modality, an image emotion presentation modality, a video emotion presentation modality and a mechanical motion emotion presentation modality.

In another embodiment of the present disclosure, the at least one first emotion presentation modality may further include at least one of a voice emotion presentation modality, an image emotion presentation modality, a video emotion presentation modality and a mechanical motion emotion presentation modality.

In another embodiment of the present disclosure, if the first emotion presentation instruction includes a plurality of emotion presentation modalities, the text emotion presentation modality is preferentially used to present the at least one emotional style; and then the at least one emotional style is complementally presented by one or more of the voice emotion presentation modality, the image emotion presentation modality, the video emotion presentation modality and the mechanical motion emotion presentation modality.

With respect to the devices in the above embodiments, the specific manners for performing operations for individual modules therein have been described in detail in the embodiments regarding the methods, which will not be elaborated herein.

Figure 4:
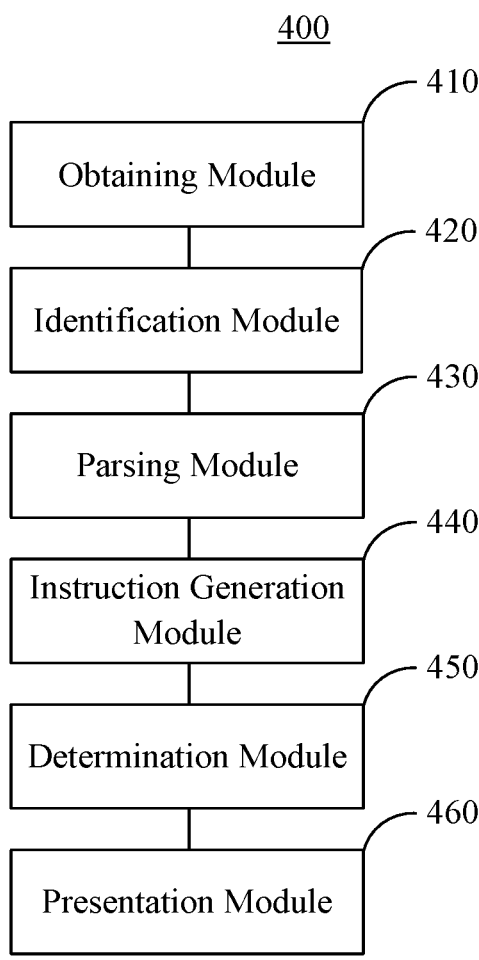
FIG. 4 is a block diagram of a device for presenting an emotion according to another exemplary embodiment of the present disclosure.

FIG. 4 is a block diagram of a device 400 for presenting an emotion according to another exemplary embodiment of the present disclosure. As shown in FIG. 4, the device 400 for presenting an emotion may include an obtaining module 410, an identification module 420, a parsing module 430, an instruction generation module 440, a determination module 450, and a presentation module 460.

The obtaining module 410 is configured to obtain emotion information of a user.

The identification module 420 is configured to identify emotions of the emotion information to obtain an emotional style.

The parsing module 430 is configured to parse an intention of the emotion information according to the emotional style to obtain the intention.

The instruction generation module 440 is configured to generate a first emotion presentation instruction according to the intention and a preset emotion presentation instruction decision process, wherein the first emotion presentation instruction includes at least one first emotion presentation modality and at least one emotional style, and the at least one first emotion presentation modality includes a text emotion presentation modality.

The determination module 450 is configured to determine whether the at least one first emotion presentation modality conforms to an emotion presentation condition, and if the at least one first emotion presentation modality conforms to the emotion presentation condition, present an emotion corresponding to one or more of the at least one emotional style according to each of the at least one first emotion presentation modality; and if it is determined that the at least one first emotion presentation modality does not conform to the emotion presentation condition, generate a second emotion presentation instruction according to the first emotion presentation, wherein the second emotion presentation instruction includes at least one second emotion presentation modality, and the at least one second emotion presentation modality is obtained by adjusting the at least one first emotion presentation modality.

The presentation module 460 is configured to present an emotion according to the at least one second emotion presentation modality.

According to technical solutions provided by embodiments of the present disclosure, whether the first emotion presentation modality conforms to the emotion presentation condition can be determined, and the final emotion presentation modality can be adjusted based on the determination result, and thus the instantaneity can be improved and user experience can be further improved.

Figure 5:
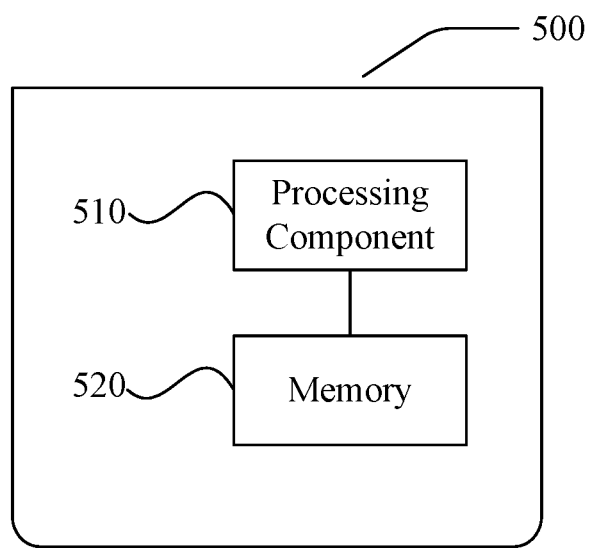
FIG. 5 is a block diagram of a device for presenting an emotion according to an exemplary embodiment of the present disclosure.

FIG. 5 is a block diagram of a device 500 for presenting an emotion according to an exemplary embodiment of the present disclosure.

Referring to FIG. 5, the device 500 includes a processing component 510 that further includes one or more processors, and memory resources represented by a memory 520 for storing instructions executable by the processing component 510, such as application programs. The application programs stored in the memory 520 may include one or more modules each corresponding to a set of instructions. Further, the processing component 510 is configured to execute the instructions to perform the above method for presenting an emotion.

The device 500 may also include a power component configured to perform power management of the device 500, wired or wireless network interface(s) configured to connect the device 500 to a network, and an input/output (I/O) interface. The device 500 may operate based on an operating system based on stored in the memory 520, such as Windows Server™, Mac OS X™, Unix™, Linux™, Free-BSD™, or the like.

A computer readable storage medium storing computer executable instructions that, when executed by a processor of the device 500 for presenting an emotion, cause the device 500 to perform a method including: obtaining a first emotion presentation instruction, wherein the first emotion presentation instruction includes at least one first emotion presentation modality and at least one emotional style, and the at least one first emotion presentation modality includes a text emotion presentation modality; and presenting an emotion corresponding to one or more of the at least one emotional style according to each of the at least one first emotion presentation modality.

Persons skilled in the art may realize that, units and algorithm steps of examples described in combination with the embodiments disclosed here can be implemented by electronic hardware, computer software, or the combination of the two. In order to clearly describe the interchangeability between the hardware and the software, compositions and steps of each example have been generally described according to functions in the foregoing descriptions. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, device and unit, reference may be made to the corresponding process in the method embodiments, and the details are not to be described here again.

In several embodiments provided in the present application, it should be understood that the disclosed system, device, and method may be implemented in other ways. For example, the described device embodiments are merely exemplary. For example, the unit division is merely logical functional division and may be other division in actual implementation. For example, multiple units or components may be combined or integrated into another system, or some features may be ignored or not performed. Furthermore, the shown or discussed coupling or direct coupling or communication connection may be accomplished through indirect coupling or communication connection between some interfaces, devices or units, or may be electrical, mechanical, or in other forms.

Units described as separate components may be or may not be physically separated. Components shown as units may be or may not be physical units, that is, may be integrated or may be distributed to a plurality of network units. Some or all of the units may be selected to achieve the objective of the solution of the embodiment according to actual demands.

In addition, the functional units in the embodiments of the present invention may either be integrated in a processing module, or each be a separate physical unit; alternatively, two or more of the units are integrated in one unit. The integrated units may be implemented through hardware or software functional units.

If implemented in the form of software functional units and sold or used as an independent product, the integrated units may also be stored in a computer readable storage medium. Based on such understanding, the technical solution of the present invention or the part that makes contributions to the prior art, or all or a part of the technical solution may be substantially embodied in the form of a software product. The computer software product is stored in a storage medium, and contains several instructions to instruct computer equipment (such as, a personal computer, a server, or network equipment) to perform all or a part of steps of the method described in the embodiments of the present invention. The storage medium includes various media capable of storing program codes, such as, a USB flash drive, a mobile hard disk, a Read-Only Memory (ROM), a Random Access Memory (RAM), a magnetic disk or an optical disk.

The foregoing descriptions are merely specific embodiments of the present invention, but the protection scope of the present invention is not limited hereto. Any equivalent modification or replacement easily thought of by persons skilled in the art within the technical scope of the present invention should fall within the protection scope of the present invention. Therefore, the protection scope of the present invention is subject to the appended claims.

What is claimed is:

1. A method for presenting an emotion of a robot with an intelligent interaction function, comprising:
    obtaining a first emotion presentation instruction for emotion information, wherein the first emotion presentation instruction comprises at least one first emotion presentation modality and at least one emotional style, the at least one first emotion presentation modality comprises a text emotion presentation modality, and the at least one first emotion presentation modality belongs to part or all of multiple emotion presentation modalities of the robot; and
    presenting, by an emotion output device of the robot, an emotion corresponding to one or more of the at least one emotional style in response to the emotion information, according to each of the at least one first emotion presentation modality,
    wherein the at least one first emotion presentation modality further comprises: at least one of a voice emotion presentation modality, an image emotion presentation modality, a video emotion presentation modality and a mechanical motion emotion presentation modality,
    wherein the presenting, by an emotion output device of the robot, an emotion corresponding to one or more of the at least one emotional style in response to the emotion information, according to each of the at least one first emotion presentation modality comprises:
    if the at least one first emotion presentation modality conforms to an emotion presentation condition, presenting an emotion according to the at least one first emotion presentation modality,
    wherein the method further comprising:
    if it is determined that the at least one first emotion presentation modality does not conform to the emotion presentation condition according to dynamic changes, generating, by the emotion output device of the robot, a second emotion presentation instruction according to the first emotion presentation instruction, wherein the second emotion presentation instruction comprises at least one second emotion presentation modality, and the at least one second emotion presentation modality is obtained by feedback adjustment of the at least one first emotion presentation modality; and
    presenting, by the emotion output device of the robot, an emotion according to the at least one second emotion presentation modality,
    wherein the at least one second emotion presentation modality comprises: at least one of a text emotion presentation modality, a voice emotion presentation modality, an image emotion presentation modality, a video emotion presentation modality and a mechanical motion emotion presentation modality, the at least one second emotion presentation modality is different from the at least one first emotion presentation modality,
    wherein a selection of the at least one first emotion presentation modality or the at least one second emotion presentation modality depends on one of following factors: an emotion output device and an application state thereof, types of interaction scenarios and types of conversations.

2. The method of claim 1, wherein the at least one emotional vocabulary is divided into different levels according to different emotional intensities.

3. The method of claim 1, wherein the emotional vocabulary is a multiple emotional vocabulary, and the multiple emotional vocabulary comprises a combination of a plurality of vocabularies, and each of the multiple emotional vocabulary has no separate emotional style attribute.

4. The method of claim 1, further comprising:
    presenting an emotion corresponding to an emotional style unspecified by the first emotion presentation instruction according to each of the at least one first emotion presentation modality, wherein emotional intensity corresponding to the unspecified emotional style is lower than the emotional intensity corresponding to the at least one emotional style, or emotional polarity corresponding to the unspecified emotional style is consistent with the emotional polarity corresponding to the at least one emotional style.

5. The method of claim 4, further comprising:
    determining a value of emotional intensity corresponding to at least one emotional style in an emotion presentation text composed of the at least one emotional vocabulary; and
    determining whether the emotional intensity corresponding to the at least one emotional style conforms to the first emotion presentation instruction according to the value of the emotional intensity,
    wherein emotional intensity corresponding to the i-th emotional style in the emotion presentation text is calculated by the following formula:

$$\text{round}[n/N*1/[1+\exp(-n+1)]*\max\{a1, a2, \ldots, an\}],$$

wherein round[X] represents rounding off X, n represents the number of emotional vocabularies corresponding to the i-th emotional style, N represents the number of emotional vocabularies in the emotion presentation text, M represents the number of emotional styles corresponding to the N emotional vocabularies, exp(x) represents an exponential function with a natural constant e as a base, a1, a2, ..., an represent emotional intensities of the n emotional vocabularies respectively corresponding to an emotional style M, max{a1, a2, ..., an} represents the maximum value of the emotional intensities, and wherein the n, N and M are positive integers.

6. The method of claim 1, wherein if it is determined that the at least one first emotion presentation modality does not conform to the emotion presentation condition, the generating a second emotion presentation instruction according to the first emotion presentation instruction comprises:
    if it is detected that the failure of a user output device affects the presentation of the first emotion presentation modality or the user output device does not support the presentation of the first emotion presentation modality, determining that the at least one first emotion presentation modality does not conform to the emotion presentation condition; and adjusting the at least one first emotion presentation modality in the first emotion presentation instruction to obtain the at least one second emotion presentation modality in the second emotion presentation instruction.

7. The method of claim 1, wherein if it is determined that the at least one first emotion presentation modality does not conform to the emotion presentation condition, the generating a second emotion presentation instruction according to the first emotion presentation instruction comprises:
  determining that the at least one first emotion presentation modality does not conform to the emotion presentation condition according to changes of user requirements, dynamic changes of a background control and/or changes of application scenario requirements; and
  adjusting the at least one first emotion presentation modality in the first emotion presentation instruction to obtain the at least one second emotion presentation modality in the second emotion presentation instruction.

8. The method of claim 1, wherein if the first emotion presentation instruction comprises a plurality of emotion presentation modalities, the text emotion presentation modality is preferentially used to present the at least one emotional style, and then the at least one emotional style is complementally presented by using one or more of the voice emotion presentation modality, the image emotion presentation modality, the video emotion presentation modality and the mechanical motion emotion presentation modality.

9. A device with an intelligent interaction function for presenting an emotion, comprising:
  a processor; and
  a memory for storing instructions executable by the processor;
  wherein the processor is configured to:
  obtain a first emotion presentation instruction for emotion information, wherein the first emotion presentation instruction comprises at least one first emotion presentation modality and at least one emotional style, the at least one first emotion presentation modality comprises a text emotion presentation modality, and the at least one first emotion presentation modality belongs to part or all of multiple emotion presentation modalities of the robot; and
  present, by an emotion output device of the robot, an emotion corresponding to one or more of the at least one emotional style in response to the emotion information, according to each of the at least one first emotion presentation modality,
  wherein the at least one first emotion presentation modality further comprises: at least one of a voice emotion presentation modality, an image emotion presentation modality, a video emotion presentation modality and a mechanical motion emotion presentation modality,
  wherein the present, by an emotion output device of the robot, an emotion corresponding to one or more of the at least one emotional style in response to the emotion information, according to each of the at least one first emotion presentation modality comprises:
  if the at least one first emotion presentation modality conforms to an emotion presentation condition, presenting an emotion according to the at least one first emotion presentation modality,
  wherein the processor is further configured to:
  if it is determined that the at least one first emotion presentation modality does not conform to the emotion presentation condition according to dynamic changes, generate, by the emotion output device of the robot, a second emotion presentation instruction according to the first emotion presentation instruction, wherein the second emotion presentation instruction comprises at least one second emotion presentation modality, and the at least one second emotion presentation modality is obtained by feedback adjustment of the at least one first emotion presentation modality; and
  present, by the emotion output device of the robot, an emotion according to the at least one second emotion presentation modality,
  wherein the at least one second emotion presentation modality comprises: at least one of a text emotion presentation modality, a voice emotion presentation modality, an image emotion presentation modality, a video emotion presentation modality and a mechanical motion emotion presentation modality, the at least one second emotion presentation modality is different from the at least one first emotion presentation modality,
  wherein a selection of the at least one first emotion presentation modality or the at least one second emotion presentation modality depends on one of following factors: an emotion output device and an application state thereof, types of interaction scenarios and types of conversations.

10. The device of claim 9, wherein the processor is further configured to:
  if it is detected that the failure of a user output device affects the presentation of the first emotion presentation modality or the user output device does not support the presentation of the first emotion presentation modality, determine that the at least one first emotion presentation modality does not conform to the emotion presentation condition; and
  adjust the at least one first emotion presentation modality in the first emotion presentation instruction to obtain the at least one second emotion presentation modality in the second emotion presentation instruction.

11. The device of claim 9, wherein the processor is further configured to:
  determine that the at least one first emotion presentation modality does not conform to the emotion presentation condition according to changes of user requirements, dynamic changes of a background control and/or changes of application scenario requirements; and
  adjust the at least one first emotion presentation modality in the first emotion presentation instruction to obtain the at least one second emotion presentation modality in the second emotion presentation instruction.

12. A computer readable storage medium storing computer executable instructions that, when executed by a processor of a device with an intelligent interaction function for presenting an emotion, cause the device to perform a method comprising:
  obtaining a first emotion presentation instruction for emotion information, wherein the first emotion presentation instruction comprises at least one first emotion presentation modality and at least one emotional style, the at least one first emotion presentation modality comprises a text emotion presentation modality, and the at least one first emotion presentation modality belongs to part or all of multiple emotion presentation modalities of the robot; and
  presenting, by an emotion output device of the robot, an emotion corresponding to one or more of the at least one emotional style in response to the emotion information, according to each of the at least one first emotion presentation modality, wherein the at least one first emotion presentation modality further comprises: at least one of a voice emotion presentation modality, an image emotion presentation modality, a video emotion presentation modality and a mechanical motion emotion presentation modality, wherein the presenting, by an emotion output device of the robot, an emotion corresponding to one or more of the at least one emotional style in response to the emotion information, according to each of the at least one first emotion presentation modality comprises:

if the at least one first emotion presentation modality conforms to an emotion presentation condition, presenting an emotion according to the at least one first emotion presentation modality, wherein the method further comprising:

if it is determined that the at least one first emotion presentation modality does not conform to the emotion presentation condition according to dynamic changes, generating, by the emotion output device of the robot, a second emotion presentation instruction according to the first emotion presentation instruction, wherein the second emotion presentation instruction comprises at least one second emotion presentation modality, and the at least one second emotion presentation modality is obtained by feedback adjustment of the at least one first emotion presentation modality; and presenting, by the emotion output device of the robot, an emotion according to the at least one second emotion presentation modality, wherein the at least one second emotion presentation modality comprises: at least one of a text emotion presentation modality, a voice emotion presentation modality, an image emotion presentation modality, a video emotion presentation modality and a mechanical motion emotion presentation modality, the at least one second emotion presentation modality is different from the at least one first emotion presentation modality, wherein a selection of the at least one first emotion presentation modality or the at least one second emotion presentation modality depends on one of following factors: an emotion output device and an application state thereof, types of interaction scenarios and types of conversations.

13. The method of claim 1, wherein the presenting, by an emotion output device of the robot, an emotion corresponding to one or more of the at least one emotional style in response to the emotion information, according to each of the at least one first emotion presentation modality comprises:

searching in an emotion presentation database according to the at least one emotional style to determine at least one emotional vocabulary corresponding to each of the at least one emotional style; and presenting the at least one emotional vocabulary.

14. The method of claim 13, wherein the each of the at least one emotional style corresponds to a plurality of emotional vocabularies, and the first emotion presentation instruction further comprises: emotional intensity corresponding to the each of the at least one emotional style and/or emotional polarity corresponding to the each of the at least one emotional style, wherein the searching in an emotion presentation database according to the at least one emotional style to determine at least one emotional vocabulary corresponding to each of the at least one emotional style comprises:

selecting the at least one emotional vocabulary from the plurality of emotional vocabularies according to the emotional intensity and/or the emotional polarity.

* * * * *